No. 768,677. Patented August 30, 1904.

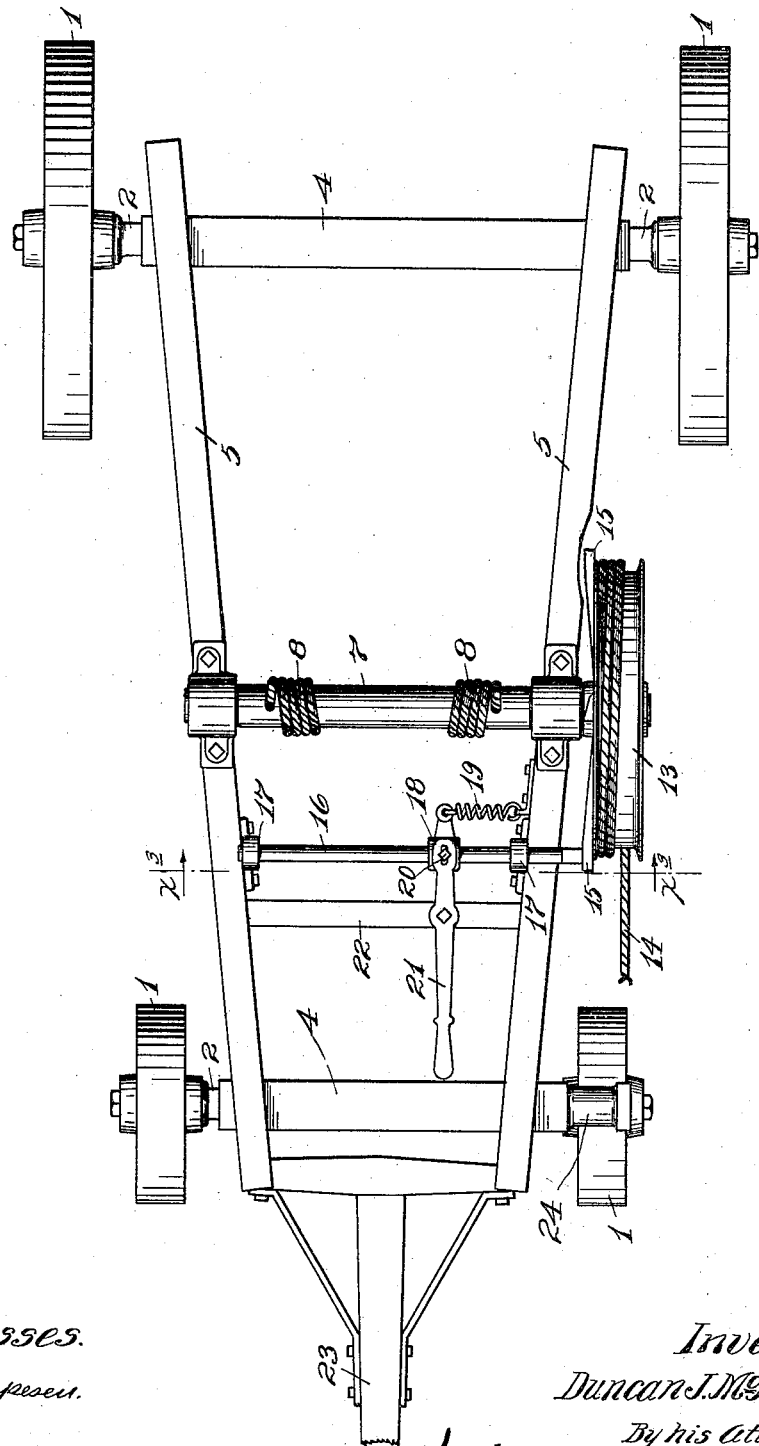

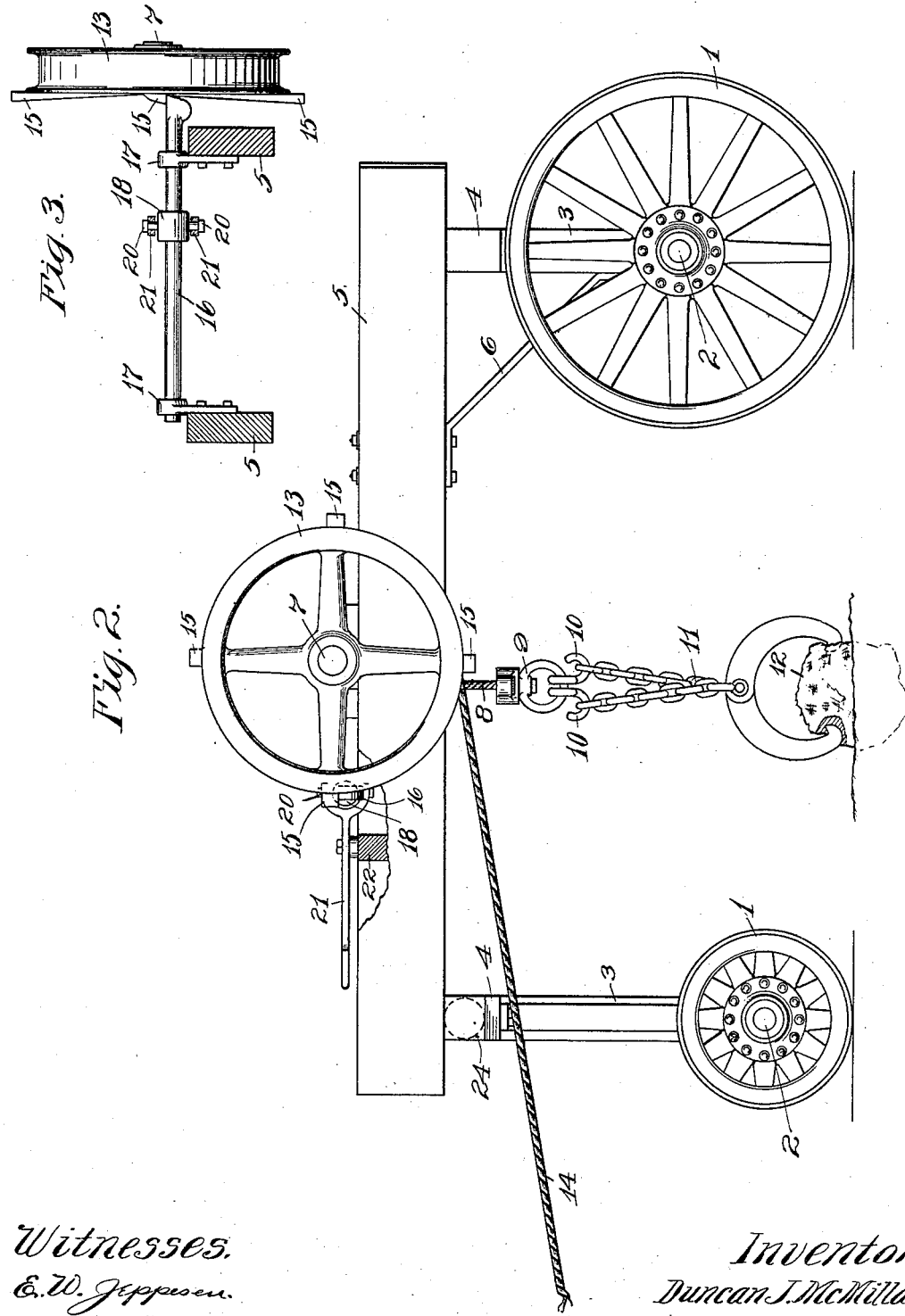

UNITED STATES PATENT OFFICE.

DUNCAN J. McMILLAN, OF MINNEAPOLIS, MINNESOTA.

STUMP-PULLER.

SPECIFICATION forming part of Letters Patent No. 768,677, dated August 30, 1904.

Application filed May 7, 1904. Serial No. 206,789. (No model.)

*To all whom it may concern:*

Be it known that I, DUNCAN J. MCMILLAN, a citizen of the United States, residing at Minneapolis, in the county of Hennepin and State of Minnesota, have invented certain new and useful Improvements in Stump-Pullers; and I do hereby declare the following to be a full, clear, and exact description of the invention, such as will enable others skilled in the art to which it appertains to make and use the same.

My invention has for its object to provide a portable stump and rock puller: and to this end the same consists of the novel devices and combinations of devices hereinafter described, and defined in the claim.

The invention is illustrated in the accompanying drawings, wherein like notations refer to like parts throughout the several views.

In said drawings, Figure 1 is a view in plan illustrating my machine. Fig. 2 is a side elevation with some parts broken away and some parts shown in section, and Fig. 3 is a detail in section on the line $x^3\ x^3$ of Fig. 1.

The numeral 1 represents strong supporting-wheels mounted on stub-axles 2, projecting outward from heavy standards 3. The standards 3 are rigidly connected to cross-timbers 4, and these in turn are connected by longitudinal timbers or girders 5, which converge toward each other from the rear end to the forward end of the machine, as clearly shown in Fig. 1 of the drawings. The braces 6 are also applied to connect and reinforce the rear standards 3 from the girders 5.

The parts 1 to 6, inclusive, so far described, constitute a wheel-supported elevated frame which is adapted to straddle a stump, stone, or other object which is to be handled by the machine. In suitable bearings on this elevated frame is mounted a windlass-shaft 7, having secured thereto in the usual way suspending-cables 8, united at their lower ends and suspending a swiveled tackle-head 9 for suspending any form of desired tackle to secure the grip desired on the stump, stone, or other object to be handled. As shown, the tackle-head 9 is provided with a pair of hooks 10, from which is suspended a grapple 11 for securing the desired grip on the stone, stump, or other object 12 under the hoisting strain applied to the pivoted members of the grapple, as clearly shown in Fig. 2.

The windlass-shaft 7 is provided with a flanged power-wheel 13, having fixed thereto and wound about the periphery thereof a power-cable 14 for the application of the requisite power available from the draft-animals which may be hitched thereto or from any other suitable source. The said wheel is provided on its inner profile face with radial arms 15, which project outward beyond the periphery of the wheel for the application of hand-power whenever so desired. These radial arms 15 are of approximately triangular form in cross-section, as shown in Fig. 3, at least at some point in each thereof radially equidistant from the center of the wheel, to afford bevel or cam surfaces on their inner profile faces for co-operation with the reversely-beveled head of a stop-latch 16, shown as in the form of a rod mounted for sliding movement in suitable bearings 17, fixed to the girders 5, as best shown in Figs. 1 and 3. To the said stop-latch 16 is fixed a crank-arm 18, connected by stiff spring 19 to the adjacent girder member 5 and tending to hold the head of the latch 16 in contact with the profile face of the windlass-wheel 13, so as to cause the same to engage behind any member of the radial arms 15 for stopping the windlass from backward rotation under its suspended load. The hub of the crank 18 has pins 20, engaged by the arms of a shipper-lever 21, pivoted to a cross-tie 22, fixed to the girders 5, and serving as a means to withdraw the latch-bolt 16 and to release the windlass-wheel for permitting the backward rotation thereof whenever so desired.

The numeral 23 represents the draft-pole pivotally attached to the forward end of the machine in any suitable way.

Having regard to the operation of the machine, it is of course obvious that the machine may be made to straddle a stump, stone, or other object to be handled under the direct pull of the draft-animals and that after the tackle has been hitched to the stump, stone, or other object that large power may be rendered available upon the windlass through the power-cable 14 under the pull of the draft-animals which may be hitched thereto. Hence it follows, of course, that within the limits of the available power the stump, stone, or other object may be pulled or raised from the ground and be suspended at any desired level with its weight supported from the elevated main frame of the machine. The latch-bolt 16, coöperating with the particular radial arm 15, which may then be engaged thereby, will prevent the backward rotation of the windlass and hold the object at the desired point of suspension when the draft-animals are unhitched from the power-cable 14. The draft-animals may then be hitched to the draft-pole 23 and the stump, stone, or other object be transported to any point desired.

A belaying bit or head 24 is shown as fixed to the forward upper end of the machine-frame, to which the power-cable 14 may be made fast whenever so desired to assist in holding the load or for any other desired purpose.

It should have been noted that in the hoisting rotation of the windlass-wheel 13 the latch-lug or triangular portions of the radial arms 15, coming in contact with the beveled head of the latch-bolt 16, will cam the same away from the windlass-wheel against the tension of the latch-bolt spring 19, thus permitting the continued rotation of the windlass in the hoisting action without interference therewith from the latch-bolt, while the latter will always be ready to engage behind the nearest member of said radial arms 15 to hold the windlass from backward rotation.

What I claim, and desire to secure by Letters Patent of the United States, is as follows:

The combination with the wheel-supported frame, the windlass thereon, the wheel of which is provided with bevel-faced latch-lugs, and a spring-held latch-bolt, with beveled head, for coöperation with said latch-lugs to hold the windlass from backward rotation under its load, and a hand-lever operative on said latch-bolt to release the same at will, substantially as described.

In testimony whereof I affix my signature in presence of two witnesses.

DUNCAN J. McMILLAN.

Witnesses:
 Jas. F. Williamson,
 F. D. Merchant.